(12) United States Patent
Tognali et al.

(10) Patent No.: US 8,410,366 B2
(45) Date of Patent: Apr. 2, 2013

(54) PROTECTION DEVICE FOR POWER CABLES WITH IMPREGNATED-PAPER-BASED INSULATION

(75) Inventors: Stéphane Tognali, Sens (FR); Pierre Gautier, Montry (FR)

(73) Assignee: Prysmian Cables et Systemes France, Sens Cedex (FR)

( * ) Notice: Subject to any disclaimer, the term of this patent is extended or adjusted under 35 U.S.C. 154(b) by 705 days.

(21) Appl. No.: 12/448,852

(22) PCT Filed: Jan. 16, 2008

(86) PCT No.: PCT/EP2008/050423
§ 371 (c)(1),
(2), (4) Date: Jan. 6, 2010

(87) PCT Pub. No.: WO2008/087151
PCT Pub. Date: Jul. 24, 2008

(65) Prior Publication Data
US 2010/0132976 A1 Jun. 3, 2010

(30) Foreign Application Priority Data
Jan. 16, 2007 (FR) ...................................... 07 52702

(51) Int. Cl.
*H01R 4/00* (2006.01)
(52) U.S. Cl. ........................................................ 174/84 R
(58) Field of Classification Search ................ 174/74 R, 174/78, 84 R, 88, 90, 91, 92, 75 B, 76
See application file for complete search history.

(56) References Cited

U.S. PATENT DOCUMENTS

| 2,105,567 | A | * | 1/1938 | Webb | 174/21 R |
| 2,195,933 | A | * | 4/1940 | Marlborough et al. | 174/21 R |
| 2,395,886 | A | * | 3/1946 | Lee | 156/48 |
| 3,017,306 | A | * | 1/1962 | Priaroggia | 156/48 |

(Continued)

FOREIGN PATENT DOCUMENTS

| EP | 0 780 949 | 6/1997 |
| FR | 2 557 390 | 6/1985 |

(Continued)

OTHER PUBLICATIONS

International Search Report dated Apr. 25, 2008.

(Continued)

*Primary Examiner* — William Mayo, III
(74) *Attorney, Agent, or Firm* — Harness, Dickey & Pierce, P.L.C.

(57) ABSTRACT

A protection device for a power cable that includes a central conductor surrounded by insulation based on paper impregnated with material based on impregnation oil may include a sheath around the insulation, a first portion of the cable stripped of the sheath, an adjacent portion of the cable stripped of both the insulation and sheath, the adjacent portion penetrating the connector; an outer protection extending over at least the first and adjacent portions, and extending over the connector; and/or a plug of high-permittivity mastic material filling an axial space extending along the adjacent portion. The outer protection may include a barrier layer in contact with the insulation along at least part of the first portion. The barrier layer may include elastomer material that is virtually impermeable to the oil. The plug may axially separate the barrier layer and connector to prevent migration of the oil into the connector.

37 Claims, 6 Drawing Sheets

U.S. PATENT DOCUMENTS

| | | | |
|---|---|---|---|
| 3,127,291 A * | 3/1964 | Betz et al. | 156/49 |
| 4,187,389 A * | 2/1980 | Foote et al. | 174/73.1 |
| 4,378,463 A | 3/1983 | Senior et al. | |
| 4,431,861 A * | 2/1984 | Clabburn et al. | 174/73.1 |
| 4,470,898 A * | 9/1984 | Penneck et al. | 252/511 |
| 4,518,819 A * | 5/1985 | Larsson et al. | 174/78 |
| 4,589,939 A * | 5/1986 | Mohebban et al. | 156/49 |
| 4,755,241 A | 7/1988 | Steinberg | |
| 5,374,784 A | 12/1994 | Wentzel | |
| 5,408,047 A * | 4/1995 | Wentzel | 174/73.1 |
| 5,714,715 A * | 2/1998 | Sundhararajan et al. | 174/20 |
| 6,624,357 B2 | 9/2003 | Cardinaels | |
| 2002/0070046 A1 | 6/2002 | Cardinaels | |

FOREIGN PATENT DOCUMENTS

| | | |
|---|---|---|
| GB | 1 283 411 | 7/1972 |
| GB | 1 434 719 | 5/1976 |
| GB | 2 097 203 | 10/1982 |
| GB | 2 327 140 | 1/1999 |

OTHER PUBLICATIONS

French Search Report dated Aug. 9, 2007.

\* cited by examiner

PROTECTION DEVICE FOR POWER CABLES WITH IMPREGNATED-PAPER-BASED INSULATION

CROSS-REFERENCE TO RELATED APPLICATIONS

This application is a national stage entry from International Application No. PCT/EP2008/050423, filed on Jan. 16, 2008, in the Receiving Office of the European Patent Office, the entire contents of which are incorporated herein by reference.

BACKGROUND

1. Field

The present invention relates to the protection of power cables having insulation based on paper impregnated with an oil-based material, and in particular to the joint devices used for joining the ends of power cables in the case in which one power cable has an insulation based on impregnated paper.

The invention may apply advantageously to transition joints or hybrid joints, that is to say for joining two power cables of different technologies, one of the cables having an insulation based on paper impregnated with an oil-based material and the other cable having plastic insulation. The invention may apply to single-conductor cables or to multi-conductor cables. It may also apply to joints allowing two power cables having insulation based on impregnated paper to be joined together.

2. Description of Related Art

In joining power cables, generally three principal types of technology are used for producing such joint devices.

In a first technology, called taped technology, the continuity of the electrical functions of the cable is provided by maintaining the continuity of the various layers that make up the cables to be joined. The operation is performed using insulating materials and semiconducting materials in tape form, mainly based on an ethylene-propylene copolymer, preferably an ethylene-propylene-diene terpolymer (EPDM). Another material may then be applied in tape form, based on an ethylene-trifluoroethylene copolymer (ETFE), polyesters or polyamides, such as nylon, or else a silicone-based material. In other applications, an insulation based on a paper tape impregnated with an oil-based material is applied to the EPDM-based tape. Although the use of EPDM-type tape materials is generally satisfactory when the cables have an insulation produced using a viscous impregnation material based on a wax-stabilized oil, for example in MIND (mineral insulated non-draining) cables, it has been found that with cables in which the insulation is made from paper impregnated with relatively fluid oils, these oils pass through the material of the EPDM-type tape, which then undergoes swelling over time and loses its mechanical and electrical properties. The same applies if silicone-based materials are used for such tapes. In all cases, sealing difficulties are encountered at the interfaces of the turns of the helical winding of the tape material, even when the latter is made from materials other than those mentioned above. Finally, the operation of winding these tape materials is tedious and tricky. This represents a substantial practical drawback.

A second technology used for joint devices of this type is what is called heat-shrinkable technology in so far as what is used here is a sheath made of a heat-shrinkable material, for example of the polyvinylidene fluoride (PVDF) type. Heat-shrinking the sheath in order to produce the joint device requires the use of a heating means, which is generally a flame torch, incurring major risks of an accident, especially when one of the cables has an insulation based on paper impregnated with an oil-based material, which may easily catch fire.

A third technology called cold-shrinkable technology consists in using, for the joint, a silicone sheath pre-expanded on a rigid support, the sheath shrinking because of the elastic memory of the material after the rigid support has been removed. However, this technology is not easily applicable in the case of cable having an impregnated-paper-based insulation because of the fact that the silicone sheath is not completely impermeable to the fluid oils that impregnate the paper. In addition, nor is such a silicone sheath sufficiently impermeable to water vapour, thereby reducing the lifetime of the joint and of the paper-based insulation. It is therefore necessary to add additional elements, for example, a rigid tape made of a material impermeable to oil and water vapour, of the ethylene-trifluoroethylene (ETFE) copolymer type with the drawbacks of the above-mentioned taped technology.

It will therefore be understood that the joints for joining power cables in the case in which one of the power cables has an impregnated-paper-based insulation, are difficult to produce and have many drawbacks.

SUMMARY

One object of the present invention is to provide a protection device for such power cables that is easy and reliable to implement and eliminates the drawbacks of the known technologies.

Another object of the invention is to produce such a protection device the lifetime of which is considerably extended compared with the joint devices of the conventional type for such power cables with an insulation based on oil-impregnated paper. Yet another object of the invention is to apply such a protection to cable terminations and to joints for joining single-conductor or three-conductor power cables.

In one embodiment, a protection device for a power cable having an insulation based on paper impregnated with a material based on an impregnation oil and an external protection comprises a continuous barrier layer placed in contact with the insulation and made of an elastomer material virtually impermeable to the impregnation oil.

According to the invention, the elastomer material is practically impermeable to water and has a Mooney viscosity of between 12 and 90 at 100° C. and preferably between 15 and 60 at 100° C.

Such a viscosity makes it possible to maintain a certain thickness in the barrier layer despite the large compressive forces exerted on the barrier layer by the external protection means constituting the cable termination or joint which then surround the barrier layer.

Advantageously, the elastomer material has a Mooney viscosity of between 15 and 60 at 100° C.

The elastomer material advantageously has a permittivity of between 2 and 100. It is therefore a high-permittivity material or an insulating material.

In a preferred embodiment, the material constituting the barrier layer has a water vapour permeation coefficient of less than $1.5 \times 10^{-8}$ g/cm·h·mmHg at 60° C. and less than $2 \times 10^{-9}$ g/cm·h·mmHg at 25° C. Such a barrier layer therefore provides the cable with protection against introduction of water molecules within the impregnated insulation paper. The elastomer material is then virtually impermeable to the impregnation oils of the insulation of the cable having an impregnated-paper insulation and practically impermeable to water vapour. The expression "material virtually impermeable to the impregnation oils" is understood within the context of the invention to mean a material through which the impregnation oils cannot pass, even if these oils are able to migrate a little into the surface layers of the material.

Such a protection device is therefore capable of maintaining over many years all its mechanical, electrical and chemical qualities for protecting the joint.

Advantageously, the thickness of the barrier layer is at least 0.1 mm.

In order to participate to the creep resistance of the set, it is also possible to provide for the barrier layer to comprise a core formed by a perforated or goffered film or a film having a rough surface, consisting of an electrically insulating material encapsulated by the aforementioned elastomer material.

The viscosity of the barrier layer may be adjusted using an at least partly crosslinked elastomer material.

To apply the elastomer material to the cable joint or termination, it is advantageous to use a barrier layer that comprises, at least over part of the length of the joint, a sheet wound around the cable, the edges of which may slightly overlap.

The barrier layer may also comprise, over at least part of the length of the cable joint or termination, a tape wound helically around the cable, the edges of the winding overlapping slightly.

The elastomer material used in the protection device according to the invention may be of the mastic type and comprise an oil-impermeable polymer chosen from butadiene-nitrile rubbers, chlorinated polyethylenes, chlorosulphonated polyethylenes, epichlorohydrin, a butyl-type polymer or a blend of said materials. The term "mastic" is understood to mean a malleable and/or a conformable and self-amalgamable paste.

The viscosity of the material may be easily adjusted by varying the proportions of the various polymers and/or by adding one or more plasticizers that are inert to the impregnation oil. This can be obtained by cross linking one or several polymer constituting the material.

The butyl polymer also makes it possible to reduce the water vapour permeation, that is to say to improve the ability of the material to seal against moisture and water vapour.

In one embodiment, the elastomer material used may be considered as an electrical insulator. The permittivity of the elastomer material is then between 2 and 10, and in particular between 2 and 5. For this purpose, the elastomer material may contain fillers selected for example from kaolin, calcined kaolin, silica, chalk or a mixture of said materials.

In another embodiment, the permittivity of the elastomer material is between 5 and 100, and preferably between 10 and 100. For this purpose, the elastomer material may contain fillers selected for example from titanium dioxide, silicon carbide, barium titanate, strontium titanate and carbon black.

In some applications, the barrier layer may be covered, at least over part of its length, by a metal layer, for example made of aluminium, with a continuous thickness of generally at least 8 μm, optionally protected by a corrosion-protection coating, for example a layer of a thermoplastic elastomer such as polyethylene, polyvinyl chloride or butyl. Such a layer, which may also be made of copper, steel, whether stainless or not, or other metallic materials, is used in particular in the case of joints for joining three-conductor cables in which it is necessary to strip the impregnated-paper-based insulation over a greater length so as make it easier to join the various phases. The metal layer preferably consists of a foil wound on laying the joint, avoiding the formation of pleats that could run the risk of breaking the barrier layer.

The barrier layer is then protected towards the outside by a protection that may have several structures.

In one embodiment, the external protection may comprise a helically wound tape made, for example, from an ethylene-propylene-diene terpolymer (EPDM).

As a variant, the external protection may comprise a heat-shrinkable sheath based, for example, on crosslinked polyolefins.

According to another variant, the external protection may comprise a cold-shrinkable sheath, for example one based on silicone or EPDM.

In one embodiment, the protection device is used for a power cable with a central conductor and a sheath around the insulation. The continuous barrier layer of elastomer material extends axially from a stripped end of the insulator close to the central conductor upto an end region of the insulator near the stripped end of the outer sheath. The barrier layer provides continuity to the protection against oil and water in liquid or gaz phase. It extends from a cable outer sheath upto a part of the opposite cable which is also oil and water vapour proof.

In one embodiment, the protection device is used for a multiconductor power cable comprising a plurality of central conductors and, for each central conductor, a sheath around the insulation. The barrier layer of elastomer material extends axially beyond the external protection.

According to another aspect, the invention also relates to a method of protecting a power cable having an insulation based on oil-impregnated paper and using a shrinkable sleeve. The method includes a step in which a barrier layer of elastomer material of the virtually oil-impermeable mastic type is placed in contact with the insulation in order to form a continuous barrier around the insulation. The barrier layer is placed before the shrinkable sleeve is shrunk.

Advantageously, the barrier layer is produced in the form of a tape wound in a helix with overlapping edges, or in the form of a sheet wound with overlap of its edges around the cable in order to form a continuous barrier around the insulation.

Advantageously, the mastic-type material is wound along the paper insulation in order to form a barrier layer extending continuously around the insulation.

Advantageously, the barrier layer is covered by a metal layer when laying the joint, that is to say before a shrinkable sleeve is shrunk thereonto.

Such a protection device may be used not only in joints for joining two power cables having an insulation based on oil-impregnated paper, but also as a hybrid joint for joining a power cable having an insulation based on oil-impregnated paper with a power cable having a plastic insulation. It may also be used for power cable terminations or for disconnectable connectors.

It may be used for joining single-conductor or three-conductor cables.

BRIEF DESCRIPTION OF THE DRAWINGS

The invention will be better understood on studying a few embodiments described by way of entirely non-limiting examples and illustrated by the appended drawings in which.

DETAILED DESCRIPTION

Figure 1:
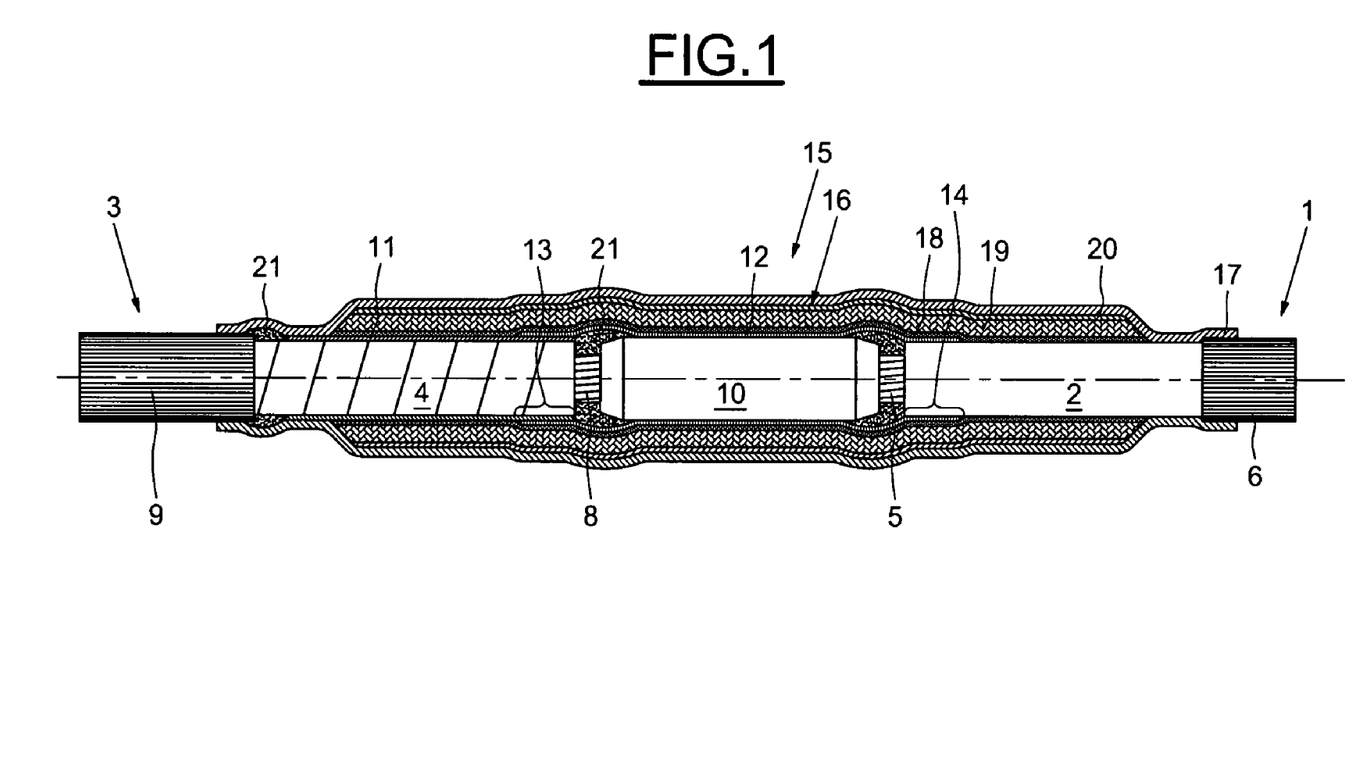
FIG. 1 is a sectional view of a hybrid joint device according to the invention in a first embodiment, applied to the case of joining two single-conductor cables, one of which has an insulation based on oil-impregnated paper and the other a plastic insulation.

As illustrated in FIG. 1, the joint joins, on the right of the figure, one end 1 of a cable having an insulation comprising a plastic insulator 2 and on the left of the figure an end 3 of a cable having an insulation comprising an insulator 4 made of paper impregnated with an oil-based material, which is wound helically around the cable.

Each of the cable ends 1 and 3 is stripped in a staged manner so that the various lengths visible in the figure correspond to various concentric layers of the cable. The cable corresponding to the end 1 comprises, concentrically, at least one central conductor 5, the plastic insulator 2 and a semiconducting layer 6. The screen, the possible armouring and the external sheath of the cable have not been shown in the figure.

Similarly, the cable corresponding to the end 3 comprises, concentrically, a central conductor 8, then the first paper insulator 4 impregnated with an oil-based material wound in a helix, then optionally other insulator layers (not shown in FIG. 1) and a lead external sheath.

The central conductors 5 and 8 of each of the two ends of the cables 1, 3 penetrate inside a central connector 10, of tubular shape, made of conducting material such as copper or a copper alloy. The intimate contact between each of the central conductors 5 and 8 with the central connector 10 is achieved by one of the known techniques, such as the crimping of part of the central connector 10 or the screwing of one or more transverse screws and/or a solder, a braze or conducting adhesive. The central connector 10 essentially provides the electrical continuity between the two cables 1, 3 joined by the joint. The rest of the joint provides the continuity of the electrical insulation around the central conductors.

The electric fields surrounding the central conductors 5 and 8 may be very high in the insulator layers surrounding the conductors. To guide the field lines along the cables 1, 3, each of the cables is equipped, around the insulators 2, 4, with a semiconducting layer 6, 9. The joint also joins these semiconducting layers 6, 9, keeping them separate from the central conductors 5 and 8.

The stripped portion of oil-impregnated paper insulator 4 is covered with a continuous barrier layer 11 made of an elastomer material impermeable to oil and to water vapour, in contact with the insulator 4 and extending axially from the stripped end of the insulator 4 close to the central connector 10 as far as an end region of the insulator 4 near the stripped end of the external sheath 9.

In the case in which the joint connects two ends of a cable 3 each having an oil-impregnated paper insulator 4, the cable end, opposite to the cable end 3, would also be covered with an elastomer barrier layer 11. In the case illustrated in FIG. 1, since the cable 1 has a plastic insulator 2, a barrier layer is unnecessary on the insulator 2.

A central sheet 12 is placed around the central connector 10 and projects axially on each side of the central connector 10 so as to at least cover an end part 13 of the paper insulator 4 and of the barrier layer 11 and an end part 14 of the plastic insulator 2. This central sheet 12 is made of a material of mastic type preferably having a high permittivity. It contributes in controlling the level of concentration of the electric field so as to prevent the joint from being destroyed by premature electrical ageing of the materials making up the joint.

The barrier layer 11, like the central sheet 12, may be made either in the form of a tape wound in a helix with overlapping edges, or in the form of a sheet wound with overlap of its edges around the cable.

A shrinkable sleeve 15 which has been brought on top of the central connector 10 extends axially and symmetrically on either side of the central connector 10, so as to cover the stripped portions of the paper insulator 4 and plastic insulator 2, and also the semiconducting layer 6 and the external sheath 9. The shrinkable sleeve 15 comprises a three-layer shrinkable body 16 that extends axially beyond the end portions 13 and 14 without however completely covering the barrier layer 11 on one side or the plastic insulator 2 on the other. The shrinkable sleeve 15 also comprises an external semiconducting sheath 17 projecting axially on either side of the shrinkable body 16, so as to cover what remains of the barrier layer 11 or of the plastic insulator 2, and also covers with an overlap the layer 6 and the external sheath 9.

In the example illustrated, the three-layer shrinkable body 16 comprises three concentric layers, the innermost of which is a layer 18 made of an elastomer material of high conductivity. This layer 18 is generally thin, with a thickness ranging from a few tenths of a millimeter to 4 millimeters. It serves to smooth the electric field over the entire length of the joint, complementing the central sheet 12. A thicker insulating central layer 19 covers the layer 18. The layer 19 essentially provides the continuity of insulation between the oil-impregnated paper insulator 4 on the one hand and the plastic insulator 2 on the other. Finally, a semiconducting external layer 20 surrounds the insulating body 19. The three-layer shrinkable body 16 is composed of a one-piece assembly comprising the three layers 18, 19 and 20 so that the insulating layer 19 has a constant thickness sandwiched between the high-permittivity layer 18 on the inside and the semiconducting layer 20 on the outside. This makes it possible to smooth the electric field within the insulating layer 19.

The axial space separating the stripped end of the paper insulator 4 and the opposite end of the central connector 10 is filled, prior to fitting the central sheet 12, by a high-permittivity mastic material 21. This material 21 is used to form a plug preventing migration of the oil coming from the impregnated paper insulator 4 into the central connector 10. Likewise, a high-permittivity mastic material 21 also forms a plug placed between the end of the barrier layer 11 and the external sheath 9.

One important function of the barrier layer 11 is to provide additional sealing against oil and water vapour while still being capable of adapting to a wide range of electric joint configurations. The water vapour permeation is measured according to the ASTM E-96 standard. The barrier layer 11 preferably has a permeation of less than $1.5 \times 10^{-8}$ g/cm·h·mmHg at 60° C. and/or less than $2 \times 10^{-9}$ g/cm·h·mmHg. In some configurations, there may be benefit in the material of the barrier layer 11 being somewhat insulating, with a permittivity between 2 and 10. In this case, the barrier layer 11 provides electrical continuity of the central insulating layer 19 of the three-layer shrinkable body 16. However, in other configurations it may be useful for the barrier layer 11 to have a high permittivity, for example greater than 10. The barrier layer 11 acts in this case as electrical continuity of the high-permittivity mastic material 21, the central sheet 12 and the high-permittivity layer 18 or the semiconducting external layer 20.

The barrier layer 11 must preferably also be able to adapt to various configurations of shrinkable sleeves 15. For example, some sleeves may be cold-shrinkable while others may be heat-shrinkable. In all cases, the barrier layer 11 is positioned before the shrinkable sleeve 15 is shrunk.

Finally, the barrier layer 11 must preferably have a suitable creep resistance so as not to reduce its thickness and break under the effect of the pressure of the shrinkable sleeve 15 or else under the effect of the expansions of the cable and of the components of the joint once the joint has been produced. A Mooney viscosity of between 12 and 20 at 100° C., and preferably greater than 15 at 100° C., allows this result to be obtained. The Mooney viscosity is measured according to the NF ISO 289-1 standard of April 2006. This creep resistance, as explained above, may be obtained either by the permanent viscosity of the elastomer material or by partially crosslinking material.

It is also possible to obtain good creep resistance of the barrier layer 11 when the latter includes a thin but mechanically strong central core surrounded by an elastomer, the Mooney viscosity of which may then be less than 15. This has the advantage that the barrier layer 11 better conforms to the rugosities of the oil-impregnated paper insulator 4 and especially the helical overlap regions in the case in which the oil-impregnated paper insulator 4 is produced from a tape. Thanks to the central core (not shown in the figure), and possibly for example consisting of a perforated or goffered rigid sheet, the low-viscosity material of the barrier layer 11 is prevented from creeping.

Other embodiments of joints using an identical barrier layer 11 will now be described with the aid of FIGS. 2 to 5. In all the figures, the similar elements bear the same references.

Figure 2:
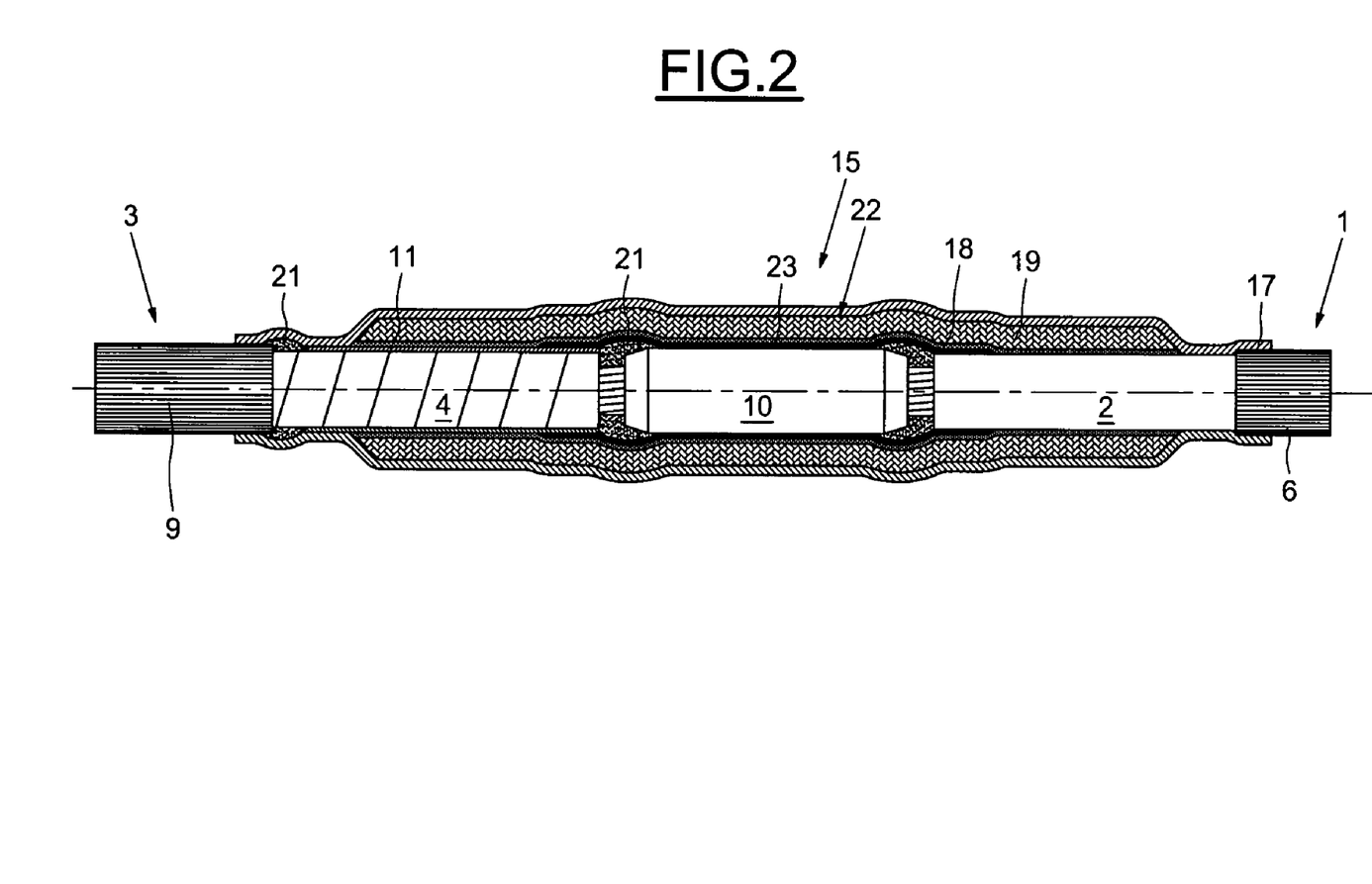
FIG. 2 is a view similar to FIG. 1 of a second embodiment.

In the second embodiment illustrated in FIG. 2, the shrinkable sleeve 15 comprises a three-layer shrinkable body 22 and the external sheath 17. Unlike in the first embodiment, there is no central sheet 12, the latter being replaced with a semiconducting layer 23 forming part of the shrinkable body 22 and lying to the inside of the high-permittivity layer 18. The semiconducting layer 23 extends axially from the overlap region 13 as far as the region 14. The three-layer shrinkable body 22 does not include a semiconducting outer layer 20. The insulating layer 19 is in direct contact with the external sheath 17, which is also semiconducting. The high-permittivity layer 18 and the insulating layer 19 extending beyond the semiconducting layer 23 without covering the insulators 2, 4 entirely. The external layer 17 comes into contact with the barrier layer 11 between the end of the shrinkable body 22 and the sheath 9. The other features of the first embodiment are identically reproduced.

Figure 3:
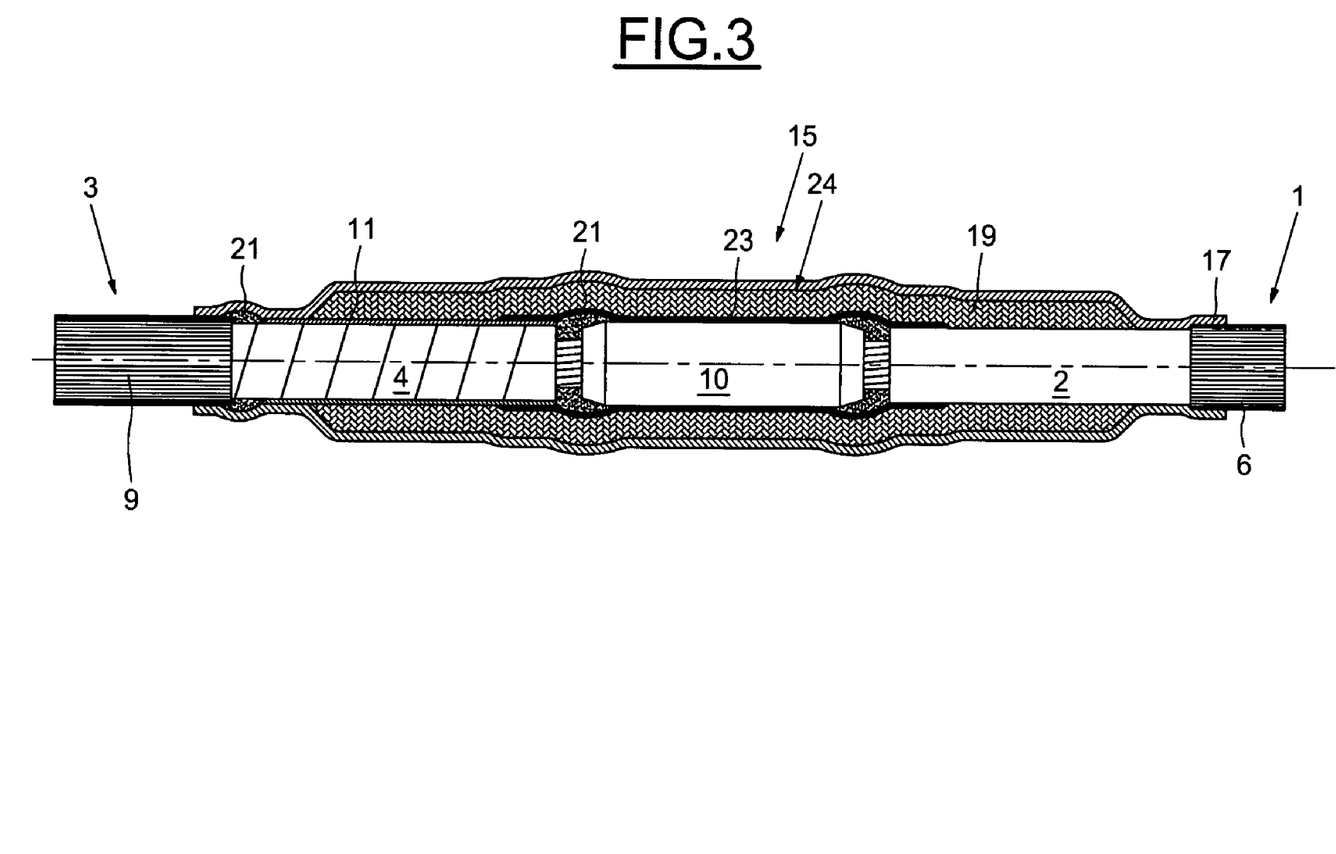
FIG. 3 is a similar view of a third embodiment.

In the third embodiment illustrated in FIG. 3, the shrinkable sleeve 15 comprises a two-layer shrinkable body 24 and the semiconducting external sheath 17. Compared with the first embodiment, there is no central sheet 12. The two-layer shrinkable body 24 comprises only a semiconducting layer 23, providing the function of the central sheet 12, and the insulating layer 19. The layer 19 extends axially on either side of the semiconducting layer 23 without however covering all of the insulators 2 and 4. The external layer 17 covers the entire joint so as to cover the semiconducting sheaths 6 and 9. The other features of the first embodiment are identically reproduced.

Figure 4:
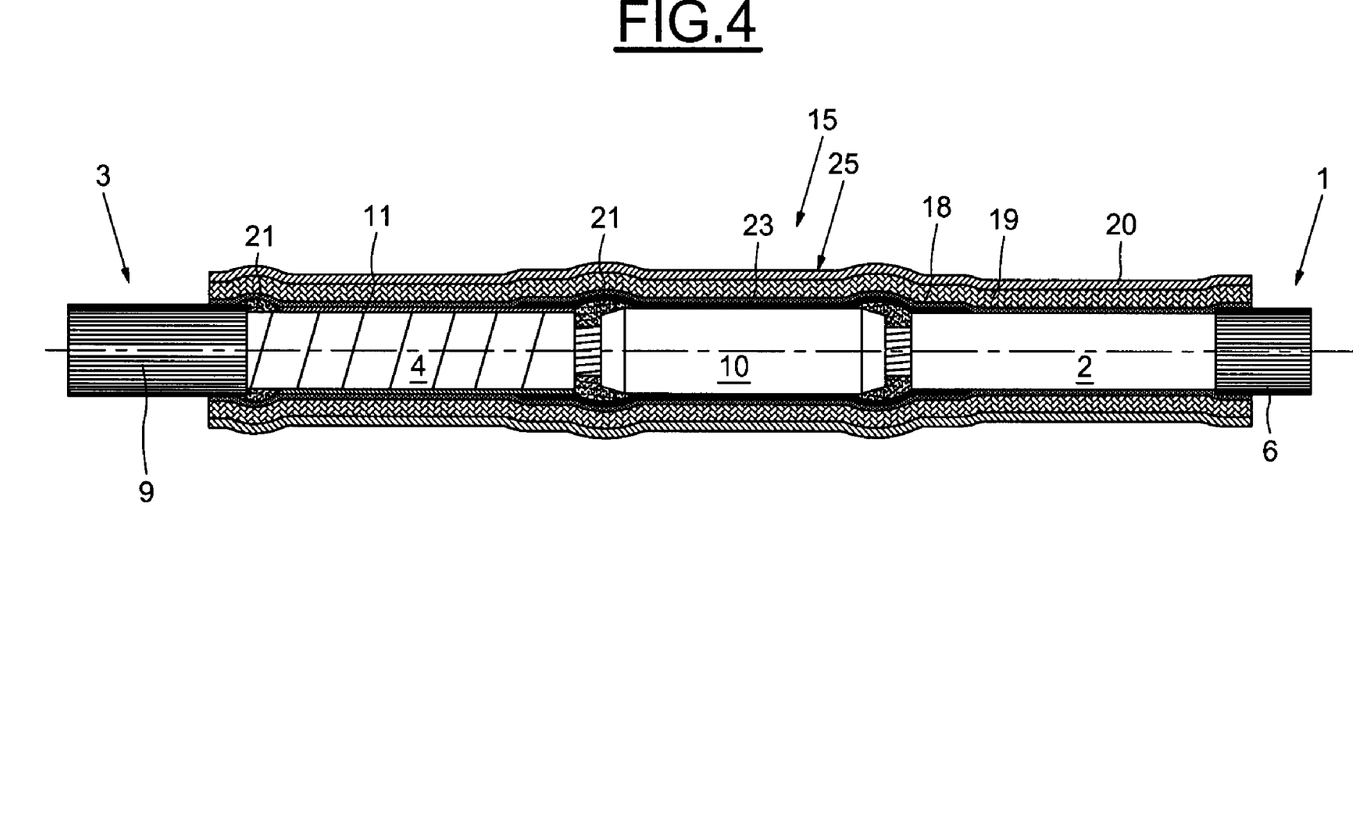
FIG. 4 is a similar view illustrating a fourth embodiment.

In the fourth embodiment illustrated in FIG. 4, the shrinkable sleeve 15 comprises only a four-layer shrinkable body 25. Compared with the first embodiment, there is neither a central sheet 12 nor an external sheath 17. The four-layer shrinkable body 25 comprises, from the inside outwards, a semiconducting layer 23, a high-permittivity layer 18, an insulating layer 19 and a semiconducting external layer 20. The three layers 18, 19 and 20 extend over identical lengths between the sheaths 6 and 9. The other features of the first embodiment are identically reproduced.

Figure 5:
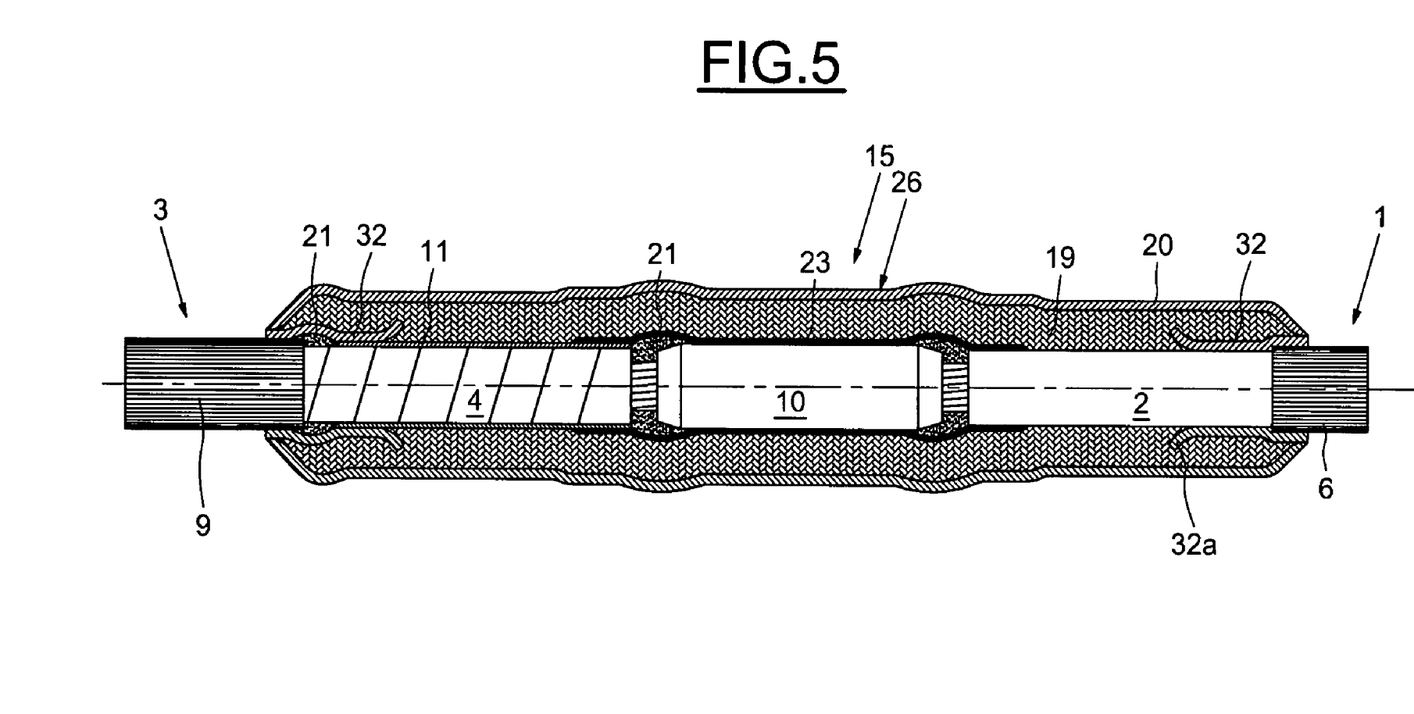
FIG. 5 is a similar view illustrating a fifth embodiment.

In the fifth embodiment illustrated in FIG. 5, the shrinkable sleeve 15 comprises a three-layer shrinkable body 26 made up, from the inside outside, of a semiconducting layer 23, an insulating layer 19 and a semiconducting external layer 20. In the fourth and fifth embodiments, the semiconducting external layer 20 provides the function of the external sheath 17 of the second and third embodiments. In addition, a semiconducting layer 32 extends inside the insulating layer 19 at each end of the body 26. The layer 32 has a radial flare 32a on its inner axial end, which penetrates slightly into the insulating layer 19. The semiconducting layer 32 is at a certain axial distance from the high-permittivity layer 18. The layers 32 and 18 are in contact with the barrier layer 11. In this embodiment, the barrier layer 11 is insulating and has a permittivity of between 2 and 5. The other features of the first embodiment are identically reproduced.

Figure 6:
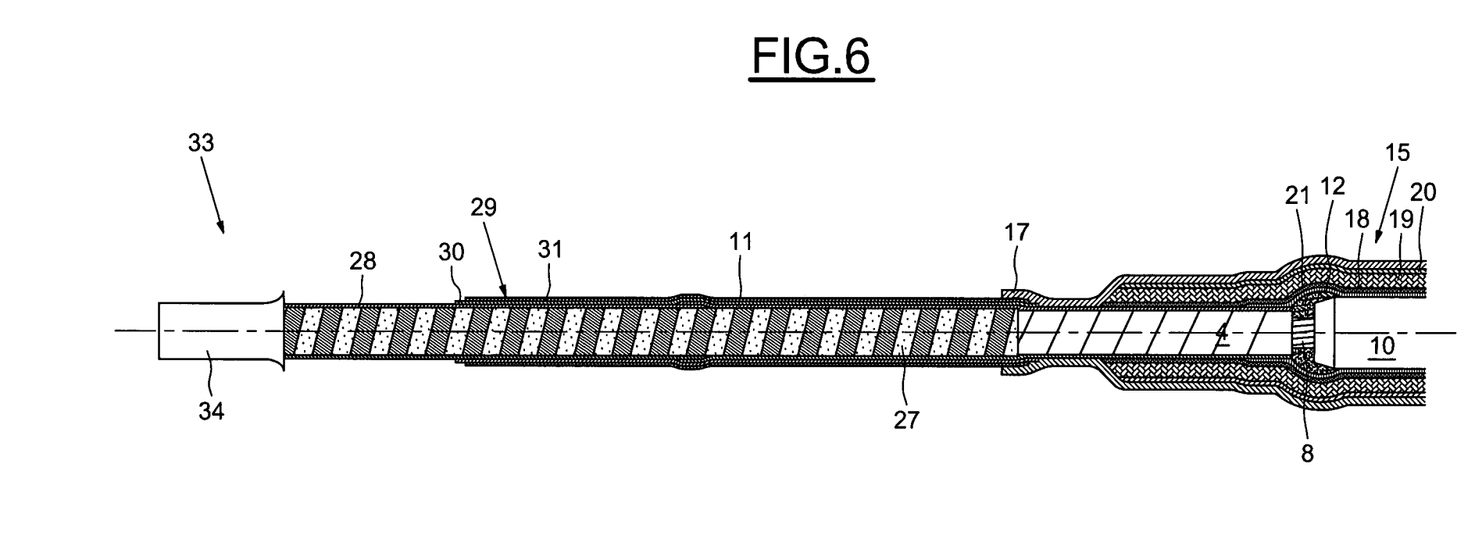
FIG. 6 is a similar view illustrating a sixth embodiment having a joint identical to the first embodiment and extended by a complex comprising an aluminium layer, particularly one suitable for joining multiconductor cables.

FIG. 6 shows a sixth embodiment, which is particularly useful when the cable having one of its insulators made of oil-impregnated paper has to be stripped over a long length. This is especially the case when an end of a cable 33 forms part of a three-conductor assembly that has to be splayed out so that each of the elementary cables 33 can be connected by a joint. The solution consisting in using a very long shrinkable sleeve would result in an excessive cost increase. However, it is necessary to increase the sealing against oil and water vapour provided the barrier layer 11 in an axial region beyond the shrinkable sleeve 15. The elementary cable 33 is partially stripped of its thickest layers so as to give flexibility. Thus, the stripping configuration comprises, from the inside outwards, a length for the central conductor 8, a length for the oil-impregnated paper insulator 4, another length for a conducting or semiconducting paper 27 wound as a helix, surrounding the first paper insulator 4, and finally a sleeve 34 common to the three elementary cables 33. The barrier layer 11 extends from the end of the paper insulator 4 on the side facing the connector 10, as far as the lead sleeve 34. The barrier layer 11 has a larger thickness close to the sleeve 34 because of the splaying of the three elementary cables. At this point, the thickness of the barrier layer 11 is sufficient to not need additional sealing protection. A two-layer sheet 29 comprises a semiconducting inner sheet 30 and an aluminium external layer 31. The thickness of the aluminium layer is between 8 µm and 15 µm and preferably 9 µm. The two-layer external sheet 29 surrounds the elementary cable from the end of the shrinkable sleeve 15 and extends axially as far as the point where the barrier layer 11 reaches a sufficient thickness, because of the proximity of the sleeve 34.

Thus, thanks to the barrier layer 11 and to the two-layer sheet 29, the cable provided with an oil-impregnated paper insulator 4 is protected even beyond the shrinkable sleeve 15. The shrinkable sleeve 15 may be similar to that described in any of the embodiments illustrated in FIGS. 1 to 5.

In the present description, the term "high permittivity" is understood to mean a permittivity as relative dielectric constant of between 5 and 100.

Although the examples described all relate to the application of the protection device of the invention to power cable joints, it will be understood that the invention is applicable, without major modification, to cable terminations or disconnectable connectors, and more generally each time it is required to protect a portion of a power cable having an insulation based on oil-impregnated paper.

The invention claimed is:

1. A protection device for a power cable that comprises a central conductor surrounded by insulation based on paper impregnated with material based on impregnation oil, an end of the central conductor penetrating a connector, the protection device comprising:

a sheath around the insulation, a first portion of the power cable being stripped of the sheath, an adjacent portion of the power cable being stripped of both the insulation and the sheath, the adjacent portion of the power cable penetrating the connector;

an outer protection extending over at least the first portion and the adjacent portion of the power cable, and extending over the connector; and a plug of high-permittivity mastic material filling an axial space extending along the adjacent portion of the power cable;

wherein the outer protection comprises a continuous barrier layer placed in contact with the insulation along at least part of the first portion of the power cable, wherein the continuous barrier layer includes elastomer material that is virtually impermeable to the impregnation oil, and wherein the plug axially separates the continuous barrier layer and the connector so as to prevent migration of the impregnation oil into the connector.

2. The protection device of claim 1, wherein the elastomer material has a Mooney viscosity greater than or equal to 15 at 100° C., and wherein the elastomer material has a Mooney viscosity less than or equal to 60 at 100° C.

3. The protection device of claim 1, wherein the elastomer material has a permittivity greater than or equal to 2 and less than or equal to 100.

4. The protection device of claim 1, wherein the elastomer material has a water vapor permeation coefficient less than $1.5 \times 10^{-8}$ g/cm-h-mmHg at 60° C. and less than $2 \times 10^{-9}$ g/cm-h-mmHg at 25° C.

5. The protection device of claim 1, wherein a thickness of the continuous barrier layer is at least 0.1 mm.

6. The protection device of claim 1, wherein the continuous barrier layer comprises a core, formed by a perforated or goffered film or a film having a rough surface, that is based on an electrically insulating material, and wherein the core is encapsulated by the elastomer material that is virtually impermeable to the impregnation oil.

7. The protection device of claim 1, wherein the continuous barrier layer comprises an at least partly crosslinked elastomer material.

8. The protection device of claim 1, wherein the continuous barrier layer comprises a sheet wound around the power cable,or wherein the continuous barrier layer comprises a tape wound helically around the power cable.

9. The protection device of claim 1, wherein the elastomer material comprises a virtually oil-impermeable polymer including one or more of a butadiene-nitrile rubber or rubbers, a chlorinated polyethylene or polyethylenes, a chlorosulphonated polyethylene or polyethylenes, epichlorohydrin, and a butyl-type polymer or polymers.

10. The protection device of claim 2, wherein a permittivity of the elastomer material is greater than or equal to 2 and less than or equal to 10, wherein the elastomer material comprises at least one filler, and wherein the at least one filler includes one or more of kaolin, calcined kaolin, silica, and chalk.

11. The protection device of claim 3, wherein a permittivity of the elastomer material is greater than or equal to 5 and less than or equal to 100, wherein the elastomer material comprises at least one filler, and wherein the at least one filler includes one or more of titanium dioxide, silicon carbide, barium titanate, strontium titanate, and carbon black.

12. The protection device of claim 1, wherein the continuous barrier layer is covered, at least over part of a length of the continuous barrier layer, by a metal layer having a thickness of at least 8 μm.

13. The protection device of claim 12, wherein the metal layer is protected by a corrosion-protection coating.

14. The protection device of claim 1, wherein the outer protection comprises a helically wound tape produced from an ethylenepropylene copolymer.

15. The protection device of claim 1, wherein the outer protection comprises a heat-shrinkable sleeve based on crosslinked polyolefins, or wherein the outer protection comprises a cold-shrinkable sleeve based on silicone or on an ethylene-propylene copolymer.

16. The protection device of claim 1, wherein the power cable comprises a central conductor and a sheath around the insulation, and wherein the continuous barrier layer extends axially from a stripped end of the insulation, close to the central conductor, up to an end region of the insulation, near a stripped end of the sheath.

17. The protection device of claim 1, wherein the power cable comprises a plurality of central conductors and, for each central conductor, a sheath around the insulation, wherein the continuous barrier layer extends axially beyond the outer protection.

18. The protection device of claim 1, wherein the elastomer material has a Mooney viscosity greater than or equal to 12 at 100° C., and wherein the elastomer material has a Mooney viscosity less than or equal to 90 at 100° C.

19. The protection device of claim 1, wherein the first portion of the power cable comprises a region devoid of the barrier layer between an end of the barrier layer and the sheath, and wherein the protection device further comprises a second high-permittivity mastic material plug around the first portion of the power cable between the end of the barrier layer and the sheath.

20. The protection device of claim 19, wherein the elastomer material has a Mooney viscosity greater than or equal to 15 at 100° C., and wherein the elastomer material has a Mooney viscosity less than or equal to 60 at 100° C.

21. The protection device of claim 20, wherein a permittivity of the elastomer material is greater than or equal to 2 and less than or equal to 10, wherein the elastomer material comprises at least one filler, and wherein the at least one filler includes one or more of kaolin, calcined kaolin, silica, and chalk.

22. The protection device of claim 19, wherein the elastomer material has a permittivity greater than or equal to 2 and less than or equal to 100.

23. The protection device of claim 22, wherein a permittivity of the elastomer material is greater than or equal to 5 and less than or equal to 100, wherein the elastomer material comprises at least one filler, and wherein the at least one filler includes one or more of titanium dioxide, silicon carbide, barium titanate, strontium titanate, and carbon black.

24. The protection device of claim 19, wherein the elastomer material has a water vapor permeation coefficient less than $1.5 \times 10^{-8}$ g/cm-h-mmHg at 60° C. and less than $2 \times 10^{-9}$ g/cm-h-mmHg at 25° C.

25. The protection device of claim 19, wherein a thickness of the continuous barrier layer is at least 0.1 mm.

26. The protection device of claim 19, wherein the continuous barrier layer comprises a core, formed by a perforated or goffered film or a film having a rough surface, that is based on an electrically insulating material, and wherein the core is encapsulated by the elastomer material that is virtually impermeable to the impregnation oil.

27. The protection device of claim 19, wherein the continuous barrier layer comprises an at least partly crosslinked elastomer material.

28. The protection device of claim 19, wherein the continuous barrier layer comprises a sheet wound around the power cable, or wherein the continuous barrier layer comprises a tape wound helically around the power cable.

29. The protection device of claim 19, wherein the elastomer material comprises a virtually oil-impermeable polymer including one or more of a butadiene-nitrile rubber or rubbers, a chlorinated polyethylene or polyethylenes, a chlorosulphonated polyethylene or polyethylenes, epichlorohydrin, and a butyl-type polymer or polymers.

30. The protection device of claim 19, wherein the continuous barrier layer is covered, at least over part of a length of the continuous barrier layer, by a metal layer having a thickness of at least 8 μm.

31. The protection device of claim 30, wherein the metal layer is protected by a corrosion-protection coating.

32. The protection device of claim 19, wherein the outer protection comprises a helically wound tape produced from an ethylenepropylene copolymer.

33. The protection device of claim 19, wherein the outer protection comprises a heat-shrinkable sleeve based on crosslinked polyolefins, or wherein the outer protection comprises a cold-shrinkable sleeve based on silicone or on an ethylene-propylene copolymer.

34. The protection device of claim 19, wherein the power cable comprises a central conductor and a sheath around the insulation, and wherein the continuous barrier layer extends axially from a stripped end of the insulation, close to the central conductor, up to an end region of the insulation, near a stripped end of the sheath.

35. The protection device of claim 19, wherein the power cable comprises a plurality of central conductors and, for each central conductor, a sheath around the insulation, wherein the continuous barrier layer extends axially beyond the outer protection.

36. A method of protecting a junction of a power cable having an insulation based on oil-impregnated paper and using a shrinkable sleeve, the method comprising:

placing a barrier layer of elastomer material of the virtually oilimpermeable mastic type in contact with the insulation in order to form a continuous barrier around the insulation;

forming a plug of high-permittivity mastic material between an end of the continuous barrier and a connector holding a stripped end of the power cable; and shrinking the shrinkable sleeve around the barrier layer and the plug.

37. The method of claim 36, wherein the barrier layer is produced in a form of a tape wound around the power cable in a helix with overlapping edges in order to form a continuous barrier around the insulation, or wherein the barrier layer is produced in a form of a sheet wound with overlap of edges of the sheet around the power cable in order to form the continuous barrier around the insulation.

* * * * *